(12) United States Patent
Yu et al.

(10) Patent No.: US 12,105,053 B2
(45) Date of Patent: Oct. 1, 2024

(54) APPARATUS AND METHOD FOR CLASSIFYING GLASS OBJECT USING ACOUSTIC ANALYSIS

(71) Applicant: Hong Kong Applied Science and Technology Research Institute Company Limited, Hong Kong (HK)

(72) Inventors: Zhinan Yu, Hong Kong (HK); Chun Chung Chan, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 323 days.

(21) Appl. No.: 17/688,845

(22) Filed: Mar. 7, 2022

(65) Prior Publication Data

US 2022/0341880 A1    Oct. 27, 2022

Related U.S. Application Data

(60) Provisional application No. 63/177,399, filed on Apr. 21, 2021.

(51) Int. Cl.
*G01N 29/12* (2006.01)
*G01N 29/04* (2006.01)
(Continued)

(52) U.S. Cl.
CPC .......... *G01N 29/12* (2013.01); *G01N 29/046* (2013.01); *G01N 29/14* (2013.01); *G01N 29/42* (2013.01); *G01N 29/4418* (2013.01)

(58) Field of Classification Search
CPC ... B60R 11/00; B60R 11/04; B60R 2011/004; B60R 2011/0085; B60R 2011/0092;
(Continued)

(56) References Cited

U.S. PATENT DOCUMENTS 3,650,396 A    3/1972  Gillespie et al.
5,454,045 A *  9/1995  Perkins ................. G06V 10/10
                                                    382/218
(Continued)

FOREIGN PATENT DOCUMENTS

CN    101391693 A  *  3/2009
CN    104443949 A  *  3/2015
(Continued)

OTHER PUBLICATIONS

JP_2003028843 (Year: 2003).*
(Continued)

*Primary Examiner* — Peter J Macchiarolo
*Assistant Examiner* — Monica S Young
(74) *Attorney, Agent, or Firm* — Idea Intellectual Limited; Margaret A. Burke; Sam T. Yip

(57) ABSTRACT

A method for classifying a glass object via acoustic analysis by a classifying apparatus is provided. The method including: receiving, by a processor, sound data of a knock sound generated by applying a knocking operation on the glass object; determining, by the processor, a type of the glass object by performing a knock-sound analysis to the sound data, wherein the type of the glass object includes an organic glass and an inorganic glass; if the type of the glass object is determined as the inorganic glass, receiving, by the processor, echo data of an echo induced by applying an ultrasonic-echo operation on the glass object; and determining, by the processor, a further type of the glass object by performing an echo-decay analysis to the echo data, wherein the further type of the glass object includes a crystal glass, a borosilicate glass and a soda-lime glass.

24 Claims, 12 Drawing Sheets

(51) Int. Cl.
*G01N 29/14* (2006.01)
*G01N 29/42* (2006.01)
*G01N 29/44* (2006.01)

(58) Field of Classification Search
CPC .............. G01S 7/4813; G01S 17/931; G01S 2013/93273; G01S 7/481; G01D 21/02; G01N 29/12; G01N 29/046; G01N 29/14; G01N 29/045; G01N 29/07; G01N 29/11; G01N 29/42; G01N 29/4418; G01N 29/4436; G01N 2291/14; G01N 2291/15; G01N 2291/0232; G01N 2291/044; G01N 2291/102
USPC .............................................. 73/112.01, 579
See application file for complete search history.

(56) References Cited

U.S. PATENT DOCUMENTS

| | | | |
|---|---|---|---|
| 8,030,589 B2 | 10/2011 | Huber et al. | |
| 8,803,020 B2 | 8/2014 | Huber et al. | |
| 9,791,414 B2 | 10/2017 | Bloch et al. | |
| 2012/0090394 A1* | 4/2012 | Abdalla | G01N 29/4436 73/596 |

FOREIGN PATENT DOCUMENTS

| | | | | |
|---|---|---|---|---|
| CN | 104443949 B | 5/2017 | | |
| CN | 110702794 A | 1/2020 | | |
| CN | 111408552 A | 7/2020 | | |
| CN | 112051336 A | 12/2020 | | |
| JP | 0910750 A | 1/1997 | | |
| JP | 2003028843 A | * | 1/2003 | |
| JP | 4268985 B2 | 5/2009 | | |
| KR | 20190091811 A | 8/2019 | | |
| WO | WO-9606690 A2 | * | 3/1996 | ............. B03B 9/061 |
| WO | WO-2022112828 A1 | * | 6/2022 | ............. B07C 5/34 |

OTHER PUBLICATIONS

International Search Report and Written Opinion of corresponding PCT Patent Application No. PCT/CN2022/081103 mailed on Jun. 15, 2022.
Edgar Lopez-Caudana et al., "Classification of materials by acoustic signal processing in real time for NAO robots", International Journal of Advanced Robotic Systems, 2017, pp. 1-10.
Juan J. Gonzalez et al., "Peniel Method for the Ultrasonic Material Identification in Robots", IEEE International Symposium on Signal Processing and Information Technology (ISSPIT), 2011, pp. 496-501.
Juan J. Gonzalez et al., "Peniel Method for the automation of the ultrasonic monitoring based on the acoustic Impedance", IEEE 8th Conference on Industrial Electronics and Applications (ICIEA), 2013, pp. 1850-1856.

* cited by examiner

Characteristics of various glass types

| Glass type | | Dominant freq. frequency | Predominant Order | Harmonic Order |
|---|---|---|---|---|
| Inorganic Glass | Soda-lime | > 2 kHz | Dominant | Harmonic detectable, nondominant |
| | Borosilicate | > 2 kHz | Nondominant | Harmonic detectable, dominant |
| | Crystal | > 2 kHz | Nondominant | Harmonic detectable, dominant |
| Organic Glass | Organic | < 2 kHz | Dominant | Harmonic undetectable |

● Predefined frequency threshold: 2kHz

FIG. 5

Preferred requirement for the transceiver design using in the Echo-Decay analysis and the Sound-Speed analysis

APPARATUS AND METHOD FOR CLASSIFYING GLASS OBJECT USING ACOUSTIC ANALYSIS

CROSS-REFERENCE WITH RELATED APPLICATIONS

This application claims priority to U.S. Provisional Utility Patent application No. 63/177,399 filed Apr. 21, 2021; the disclosure of which is incorporated herein by reference in its entity.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to a classification method and apparatus. In particular, it relates to a method, device and system for classifying a glass object via acoustic analysis.

BACKGROUND OF THE INVENTION

Theoretically, glass can be 100% recyclable because of the properties of the glass transition process. However, in practice, glass recycling is ineffective when treating a batch of glass that has different types intermixed. For example, the European Union recognized this difficulty and adopted the Regulation for End-of-Waste Criteria for Glass Cullet in 2012, with a strict emphasis on glass material separation and purification.

In conventional recycling methods, waste glass is routinely sorted by shape, under the assumption that the two major categories, flat glass and container glass, contain mostly soda-lime glass. However, this is not the case in the current market. Glass recycling companies have found that the present glass recycling paradigm results in mixing glass types. This detrimentally affects the melting and forming processes, because melting different types of glass together leads to only a small percentage of material forming as low-quality products. As such, comingled glass types necessitate additional manual sorting before the glass can be processed.

Current conventional solutions to automatically classify and sort glass are the optical sensing and machine vision methods. However, since the waste glass lacks spectral features and can include various colors on each piece of glass, using these optical sensing and machine vision methods to classify glass results in low accuracy and efficiency.

Therefore, there is a need in the art for a new classifying method other than the shape, optical and machine vision methods, so as to reduce the laborious work needed to manually sort and separate the glasses, and to increase classification accuracy and efficiency.

SUMMARY OF THE INVENTION

In accordance with one aspect of the present invention, a computer-implemented method for classifying a glass object via acoustic analysis by a classifying apparatus is provided. The method includes: receiving, by a processor of the classifying apparatus, sound data of the sound of a knock generated by knocking the glass object from a sensor of the classifying apparatus; determining, by the processor, the type of the glass object by performing a knock-sound analysis to the sound data, wherein the possible type of the glass object includes organic glass and inorganic glass; if the glass object's type is determined to be inorganic glass, receiving, by the processor, echo data of an echo induced by applying an ultrasonic-echo operation to the glass object from a transceiver of the classifying apparatus; and determining, by the processor, a further type of the glass object by performing an echo-decay analysis to the echo data, wherein the possible further type of the glass object includes crystal glass, borosilicate glass, and soda-lime glass.

In accordance with another aspect of the present invention, a computer-implemented method for classifying a glass object via acoustic analysis by a classifying apparatus is provided. The method includes: receiving, by a processor of the classifying apparatus, sound data of the sound of a knock generated by knocking the glass object from a sensor of the classifying apparatus; determining, by the processor, the type of the glass object by performing a knock-sound analysis to the sound data, wherein the possible type of the glass object includes organic glass and inorganic glass; if the glass object's type is determined to be inorganic glass, receiving, by the processor, echo data from an echo induced by applying an ultrasonic-echo operation to the glass object from a transceiver of the classifying apparatus; and determining, by the processor, a further type of the glass object by performing a sound-speed analysis of the echo data, wherein the possible further type of the glass object includes crystal glass, borosilicate glass, and soda-lime glass.

In accordance with another aspect of the present invention, a classifying apparatus for classifying a glass object via acoustic analysis is provided, and the classifying apparatus includes one or more processors configured to execute machine instructions to implement the methods described above.

BRIEF DESCRIPTION OF THE DRAWINGS

Embodiments of the invention are described in more detail hereinafter with reference to the drawings, in which:

FIG. 5 depicts characteristics of various glass types using in the Knock-Sound acoustic analysis;

DETAILED DESCRIPTION

In the following description, a method and a classifying apparatus for classifying glass objects via acoustic analysis and the likes are set forth as preferred examples. It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

Figure 1:
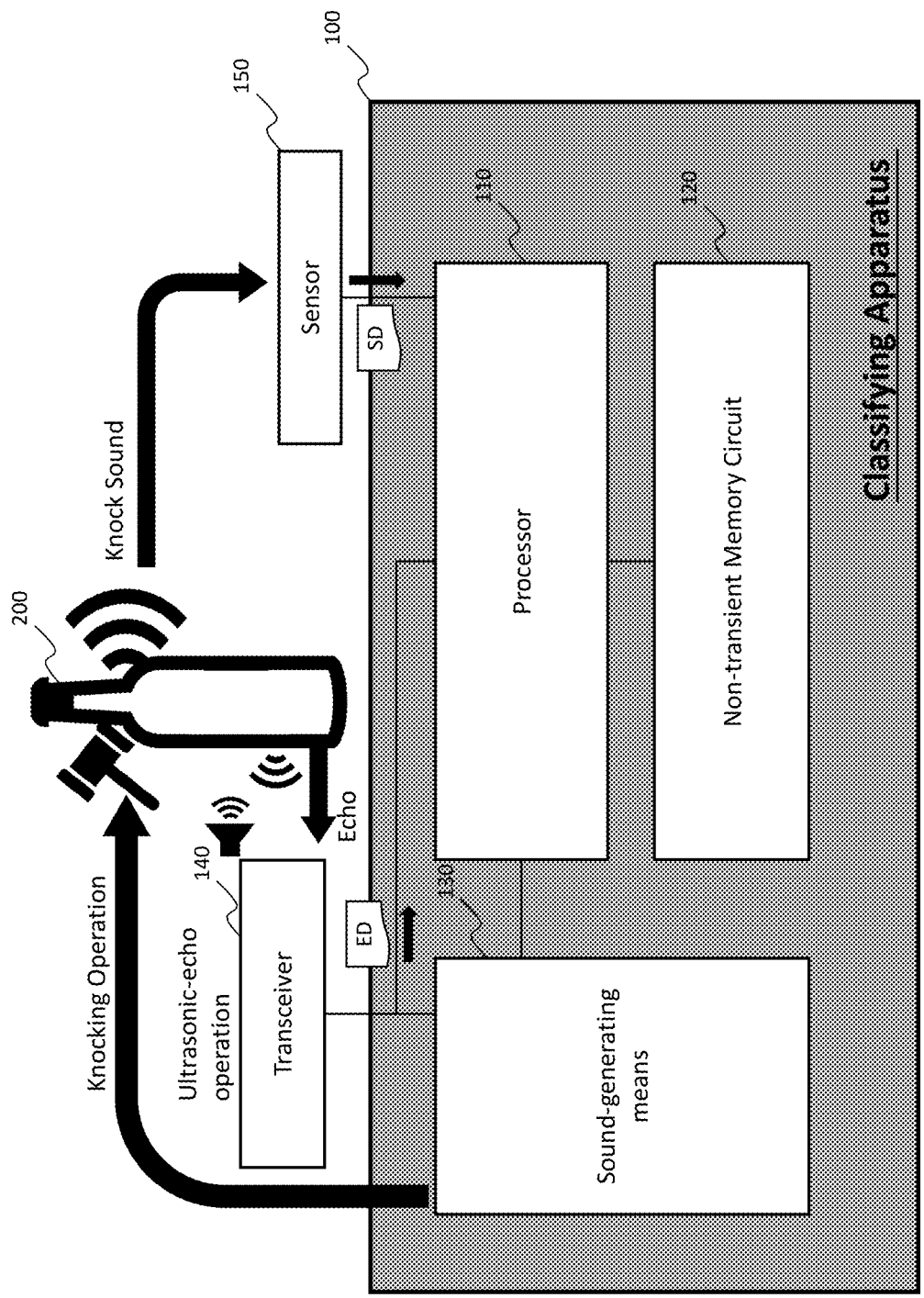
FIG. 1 depicts a block diagram illustrating a classifying apparatus for classifying a glass object via acoustic analysis in accordance with one embodiment of the present invention.

In accordance with various embodiments of the present invention, FIG. 1 depicts a classifying apparatus 100. The classifying apparatus 100 includes a processor 110, a non-transient memory circuit 120, a sound-generating means 130, a transceiver 140 and a sensor 150.

The sound-generating means 130 is configured to generate a knock sound by applying a knocking operation on the glass object 200. The transceiver 140 is an ultrasonic transducer. Furthermore, the transceiver 140 is also coupled to the sound-generating means 130 and controlled by the sound-generating means 130 to generate ultrasonic waves. That is, the sound-generating means 130 can instruct the transceiver 140 to induce an echo by applying an ultrasonic-echo operation to the glass object 200. The transceiver 140 is in contact with the glass object during the ultrasonic-echo operation.

The sensor 150 is configured to receive the knock sound. The transceiver 140 is further configured to receive the echo.

For example, during the knocking operation, the sound-generating means 130 control a hard object (e.g., a stick or a hammer) to knock the wall of the glass object 200 to generate the knock sound. The knock sound is received by a sensor 150 coupled to the processor 110. The sensor 150 sends sound data SD to the processor 110 according to the received knock sound.

Furthermore, during the ultrasonic-echo operation, the sound-generating means 130 control the transceiver 140, which can be attached to the surface of the glass object 200, to generate and output an ultrasonic wave against the glass object 200, so as to receive corresponding multiple echoes. The transceiver 140 generates echo data according to the received echoes. The transceiver 140 sends the echo data ED to the processor 110.

The non-transient memory circuit 120 is configured to store the sound data SD, the echo data ED or other kinds of data.

The processor 110 executes the machine instructions 121 to implement methods for classifying glass objects via acoustic analysis.

Embodiment 1

Figure 2:
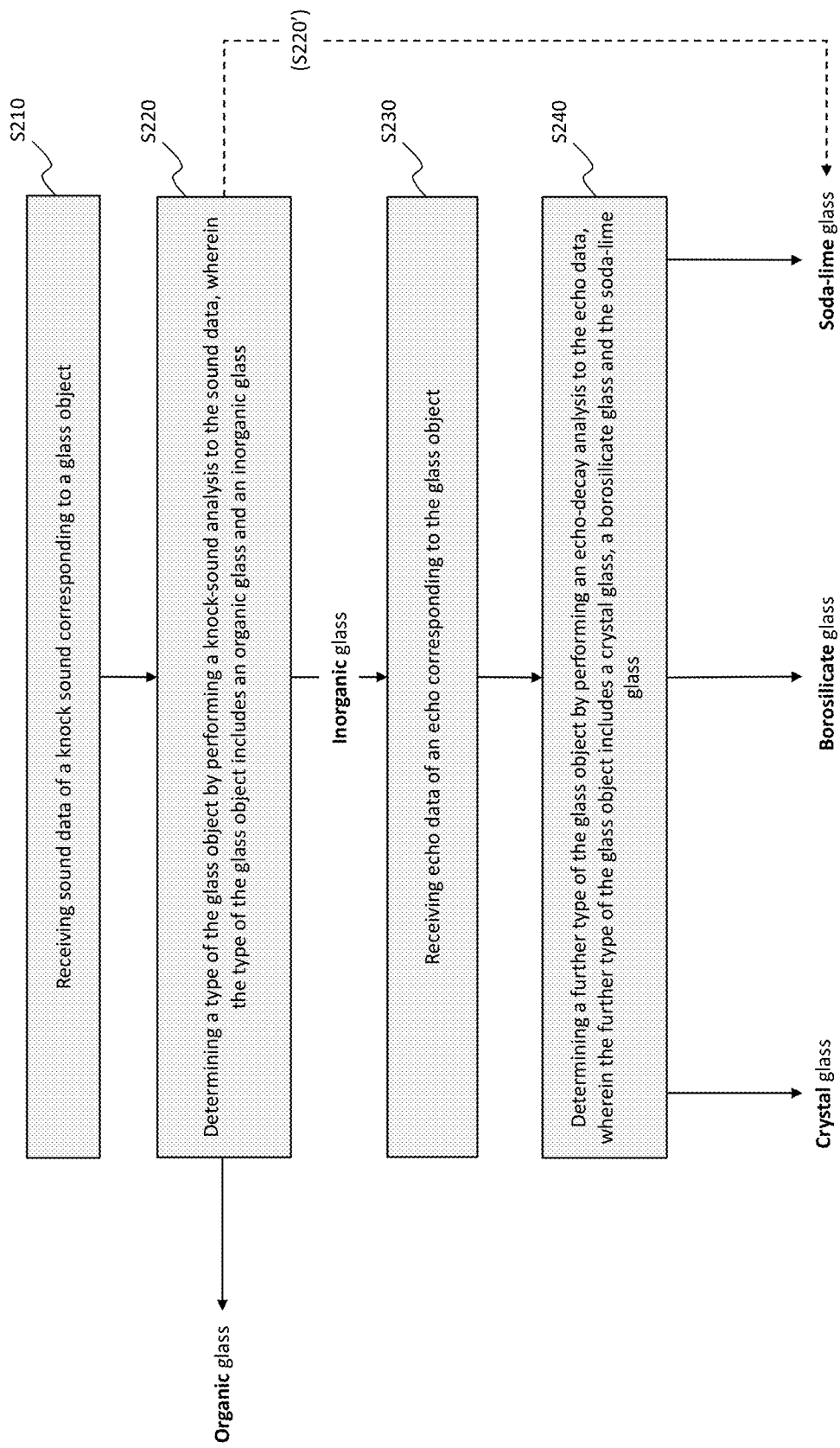
FIG. 2 depicts a flowchart of classifying the glass object via the acoustic analysis.

Referring to FIG. 2, in step S210 the processor 110 receives sound data of a knock sound corresponding to a glass object 200 from the sensor 150. Next, in step S220, the processor 110 determines a type of the glass object by performing a knock-sound analysis to the sound data, wherein the type of the glass object includes an organic glass and an inorganic glass. The step S220 includes steps S221, S222, S223, S224, S225 and S228. In other words, the "knock-sound analysis" is used for sorting organic and inorganic glass object.

In another embodiment, the type of the glass object further includes a soda-lime glass. That is, the step S220 will change to step S220', in which the processor 110 determines a type of the glass object by performing a knock-sound analysis to the sound data, wherein the type of the glass object includes an organic glass, an inorganic glass and a soda-lime glass. And the step S220' further includes steps S226 and S227 comparing to the step S220. In other words, the "knock-sound analysis" here can be used for further sorting out soda-lime glass by steps S226 and S227.

Figure 3:
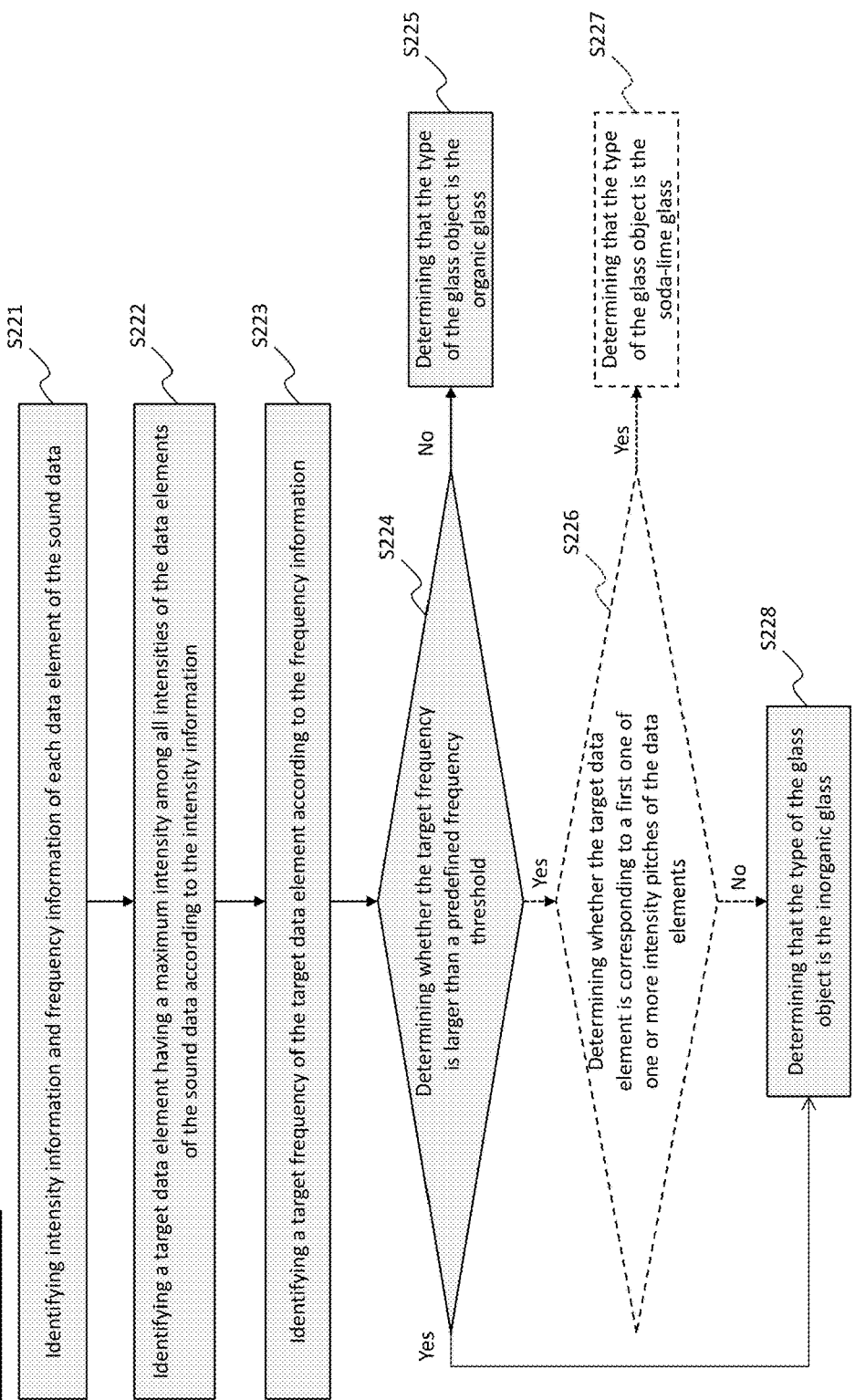
FIG. 3 depicts a flowchart of Knock-Sound acoustic analysis.

Specifically, referring to FIG. 3, in step S221, the processor 110 identifies intensity information and frequency information of each data element of the sound data. Next, in step S222, the processor 110 identifies a target data element having a maximum intensity among all intensities of the data elements of the sound data according to the intensity information. Next, in step S223, the processor 110 identifies a target frequency of the target data element according to the frequency information.

Figure 4:
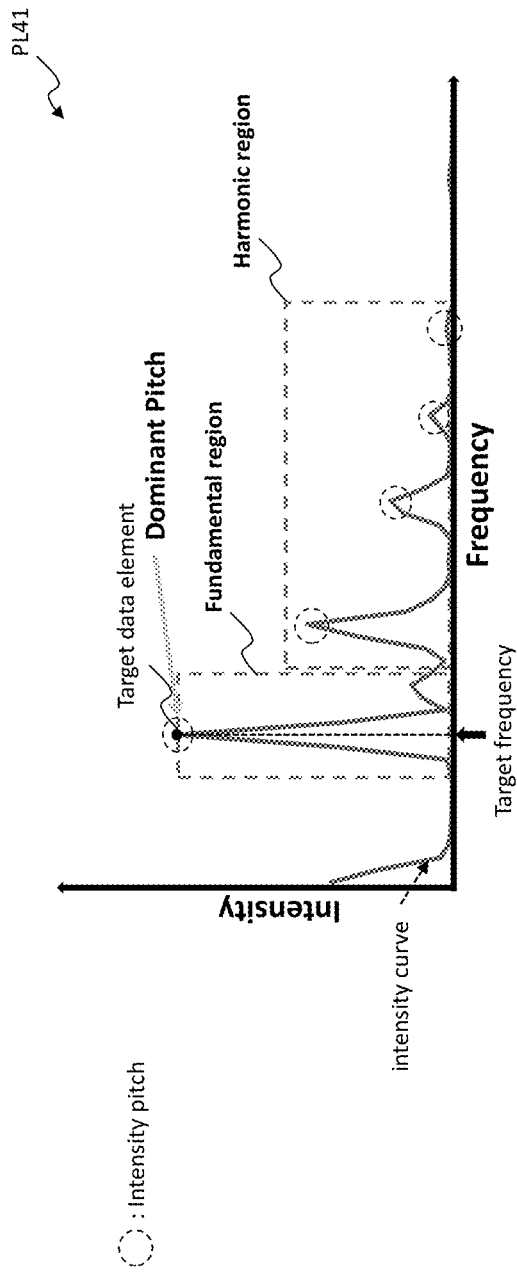
FIG. 4 depicts a schematic diagram of Knock-Sound acoustic analysis.

For example, referring to FIG. 4, a 2D domain plot PL41 can be established according to the intensity information and the frequency information of the sound data. An intensity curve is generated according to data elements of the sound data. In plot PL41, there are five intensity pitches, and each intensity pitch has a corresponding pitch data element on the top. The region that has the first intensity pitch is the fundamental region. Another region that has the rest of the pitches is the harmonic region.

Furthermore, the pitch having maximum intensity is a dominant pitch, and the pitch data element of the dominant pitch is the target data element. The target frequency is the frequency of the target data element.

When the dominant pitch is in the fundamental region, it is considered to be fundamental dominant. When the dominant pitch is in the harmonic region, it is considered to be harmonics dominant.

Referring to FIG. 5, table T51 indicates the characteristics of various glass types (soda-lime glass, borosilicate glass, crystal glass and organic glass). The dominant pitch frequency of the inorganic glass (i.e., soda-lime glass, the borosilicate glass and the crystal glass) is higher than 2 kHz. The dominant pitch frequency of the organic glass is not higher than 2 kHz. Furthermore, the soda-lime glass and the organic glass are fundamental dominant, while the borosilicate glass and the crystal glass are harmonics dominant.

As such, we can utilize these features to distinguish some types of the glass object via steps S224 and S226.

Returning to FIG. 3, in step S224 the processor 110 determines whether the target frequency is higher than a predefined frequency threshold. The predefined frequency threshold can be set as 2 kHz.

If the target frequency is not higher than a predefined frequency threshold, in step S225, the processor 110 determines that the type of the glass object is the organic glass.

If the target frequency is higher than the predefined frequency threshold, in step S228, the processor 110 determines that the type of the glass object is the inorganic glass.

In the other embodiment corresponding to step S220', the processor 110 proceeds step S226 to determine whether the glass object is the soda-lime glass or other type of the inorganic glass. In step S226, the processor 110 determines whether the target data element is corresponding to a first one of one or more intensity pitches of the data elements. In other words, the processor 110 ascertains whether the glass object's sound data is fundamental dominant or harmonics dominant by step S226.

If the target data element is corresponding to a first one of one or more intensity pitches, in step S227 the processor 110 determines that the type of the glass object is the soda-lime glass. Otherwise, the processor 110 determines that the type of the glass object is the inorganic glass (step S228) (e.g., the detailed inorganic glass type of the glass object cannot be distinguished via step S226). In this scenario, a further analysis is conducted to classify the sub-type of inorganic glass.

Returning to FIG. 2, the process continues to step S230, in which the processor 110 receives echo data of an echo corresponding to the glass object from the transceiver 140. Next, in step S240, the processor 110 determines a further type of the glass object by performing an echo-decay analysis to the echo data, wherein the further type of the glass object includes a crystal glass, a borosilicate glass and the soda-lime glass.

Figure 6:
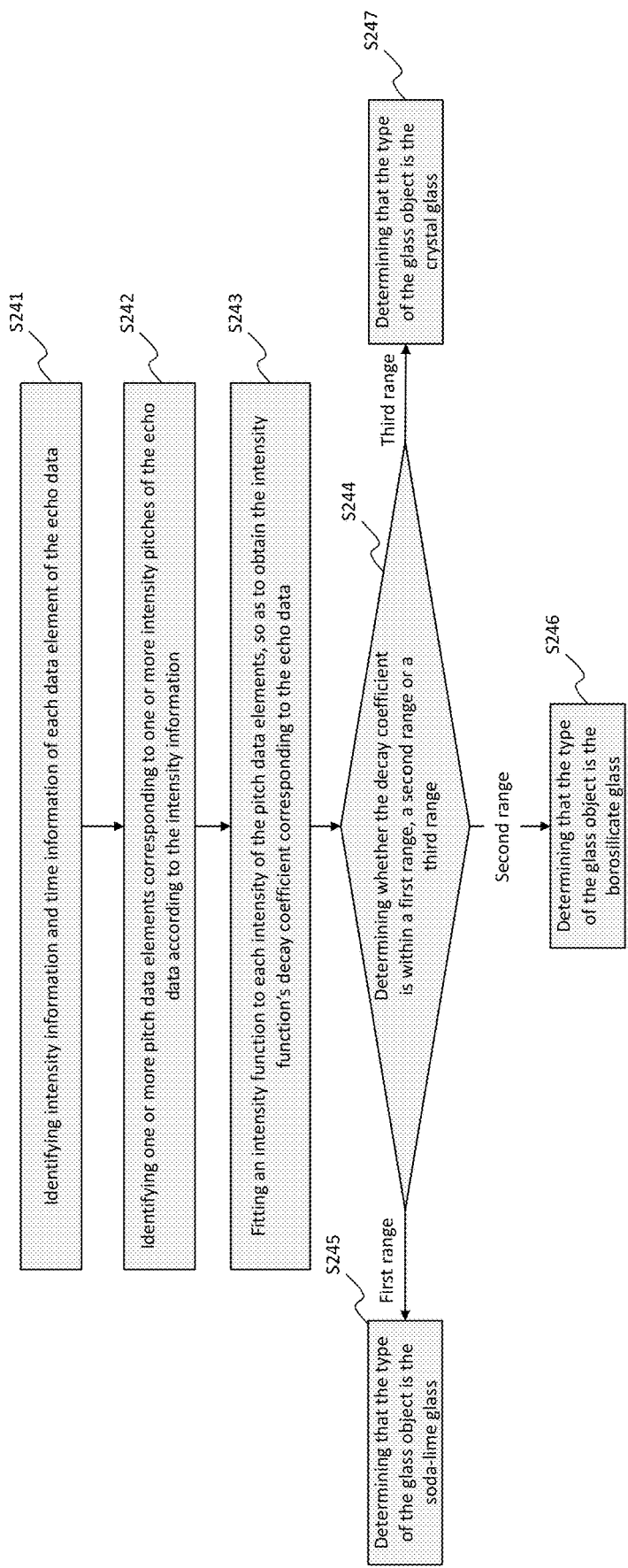
FIG. 6 depicts a flowchart of Echo-Decay acoustic analysis.

Specifically, referring to FIG. 6, in step S241 the processor 110 identifies intensity information and time information of each data element of the echo data. Next, the processor 110 identifies one or more pitch data elements corresponding to one or more intensity pitches of the echo data, according to the intensity information.

Next, in step S243, the processor 110 fits an intensity function to each intensity of the pitch data elements, so as to obtain the intensity function's decay coefficient corresponding to the echo data.

Figure 7:
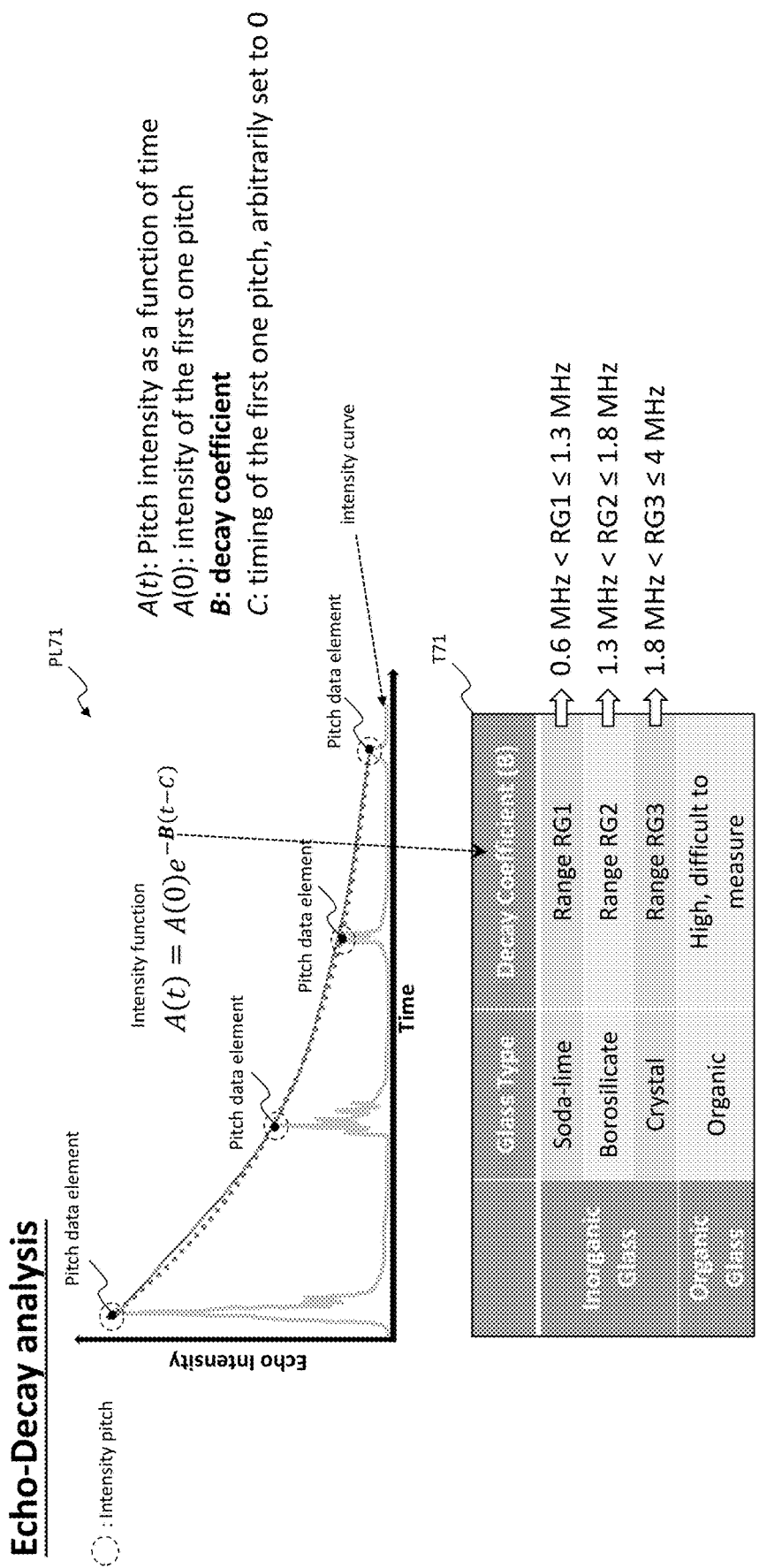
FIG. 7 depicts a schematic diagram of Echo-Decay acoustic analysis.

For example, referring to FIG. 7, a 2D domain plot PL71 can be established according to the echo data's intensity information and the time information. An intensity curve is generated according to elements of the echo data. In plot PL71, there are four intensity pitches, and each intensity pitch has a corresponding pitch data element on the top.

From these details, a trend curve can be calculated according to intensity of the pitch data elements. The intensity function (A(t)) is derived by the processor 110 to fit the trend curve corresponding to the pitch data elements. The intensity function A(t) is presented based on formula (1) below:

$$A(t) = A(0)e^{-B(t-C)} \tag{1}$$

where A(t) indicates the pitch intensity as a function of time; A(0) indicates the intensity of the first one pitch; B indicates the decay coefficient; and C indicates timing of the first one pitch, arbitrarily set to 0. The decay coefficient is dependent on material characteristics and related to acoustic impedance. A high acoustic impedance results in a low decay coefficient.

After fitting the intensity function, the processor 110 obtains the decay coefficient of the glass object. As shown by table T71, different types of inorganic glass have different ranges of decay coefficient (B). The processor 110 further determines the sub-type of the inorganic glass object according to the obtained decay coefficient (B). The sorting ranges (RG1, RG2 and RG3) can be calibrated and applied using a recycling company's own database.

For example, the first range RG1, corresponding to soda-lime glass, is higher than 0.6 MHz and lower than or equal to 1.3 MHz; the second range RG2, corresponding to borosilicate glass, is higher than 1.3 MHz and lower than or equal to 1.8 MHz; and the third range RG3, corresponding to crystal glass, is higher than 1.8 MHz and lower than or equal to 4 MHz.

In step S244, the processor 110 determines whether the decay coefficient is within the first range RG1, the second range RG2 or the third range RG3.

If the decay coefficient is within the first range RG1, the processor 110 determines that the type of the glass object is soda-lime glass. If the decay coefficient is within the second range RG2, the processor 110 determines that the type of the glass object is borosilicate glass. If the decay coefficient is within the third range RG3, the processor 110 determines that the type of the glass object is crystal glass.

Figure 8:
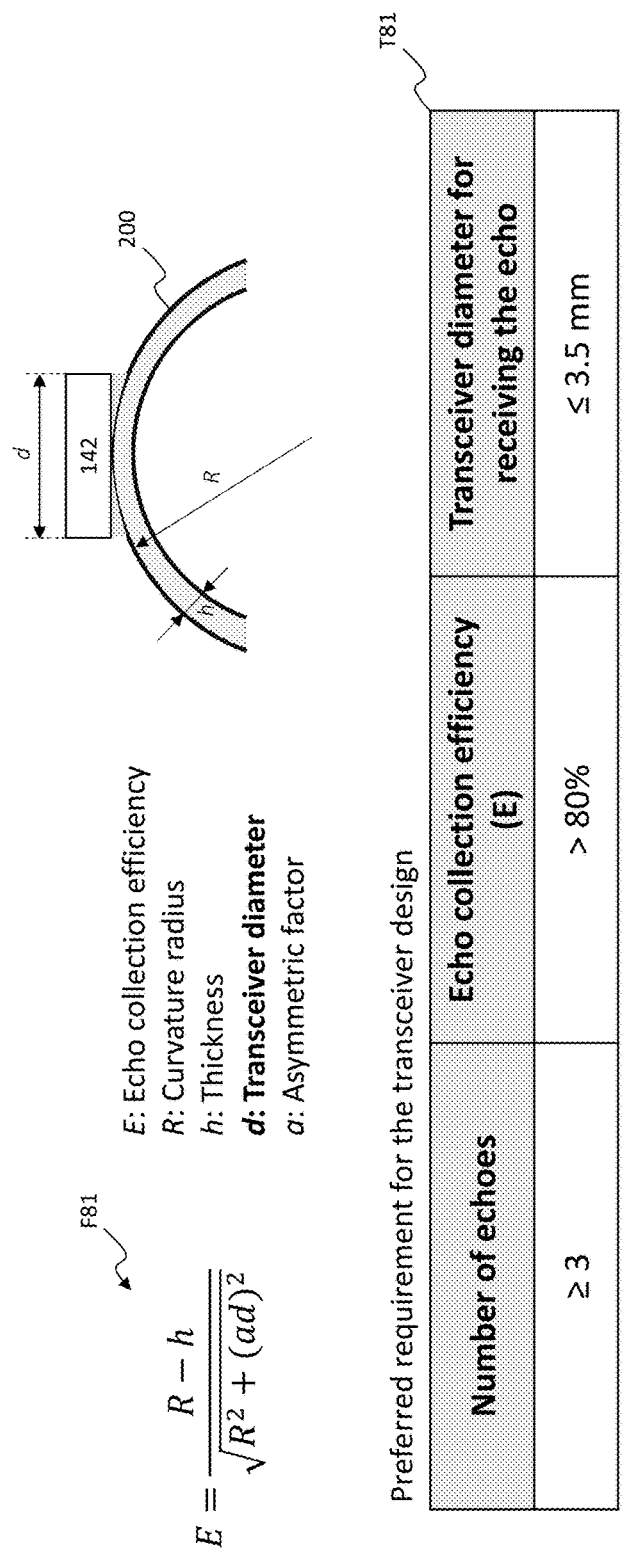
FIG. 8 depicts a schematic diagram of transceiver design for Echo-Decay acoustic analysis.

Referring to FIG. 8, requirements of the transceiver 140 design are provided for the echo-decay analysis. As presented by formula F81 (as formula (2) presented below) of FIG. 8, the echo collection efficiency is determined accordingly.

$$E = \frac{R-h}{\sqrt{R^2 + (ad)^2}} \tag{2}$$

where E indicates the echo collection efficiency; R indicates curvature radius; h indicates thickness of the wall of the glass object; d indicates the diameter of the transceiver 140; and a indicates an asymmetric factor.

As shown by table T81, there are some preferred requirements for the transceiver 140 design for the echo-decay analysis. For example, for an echo-decay analysis, the received number of echoes should be more than 3. To fulfill this requirement (i.e., number of echoes should be more than 3), the echo collection efficiency of the transceiver 140 should be higher than 80%. To achieve the 80% up echo collection efficiency, the diameter of the transceiver 140 should be smaller than or equal to 3.5 mm, and this requirement of the diameter of the transceiver 140 is the prior requirement for echo-decay analysis.

In certain scenarios, the echo intensity decay of a thick glass object (typically >1 cm) is difficult to measure. Therefore, a sound-speed analysis is provided by embodiment 2 below.

Embodiment 2

The hardware and the classifying apparatus 100 in embodiment 2 is the same as the classifying apparatus 100 in embodiment 1.

Figure 9A:
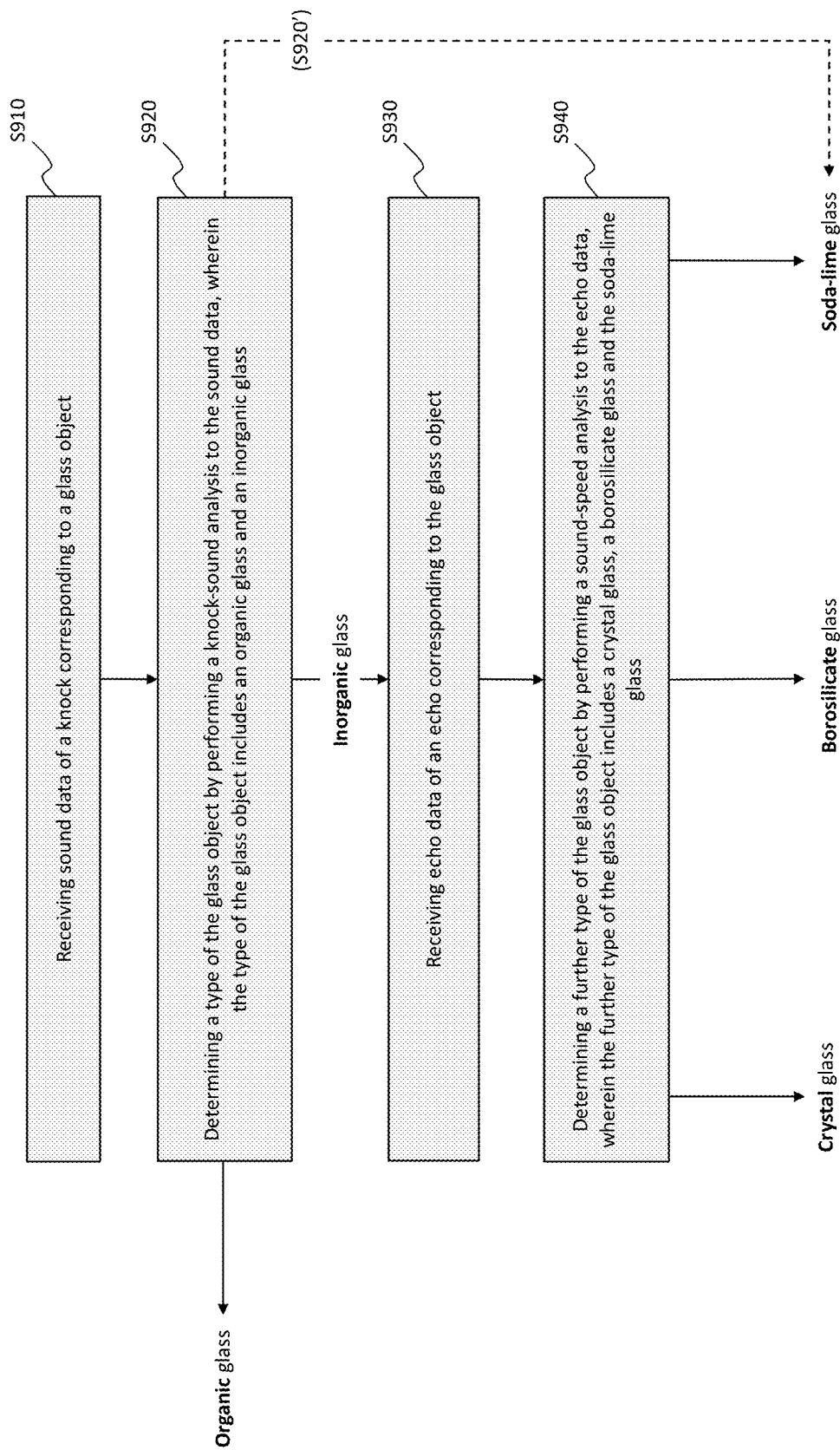
FIG. 9A depicts a flowchart of classifying the glass object via the acoustic analysis in accordance with another embodiment of the present invention.

Referring to FIG. 9A, steps S910, S920 (also S920') and S930 are similar to steps S210, S220 and S230 in FIG. 2, and the details are omitted hereto.

In step S940, the processor 110 determines a further type of the glass object by performing a sound-speed analysis to the echo data, wherein the further type of the glass object includes a crystal glass, a borosilicate glass and the soda-lime glass.

Figure 9B:
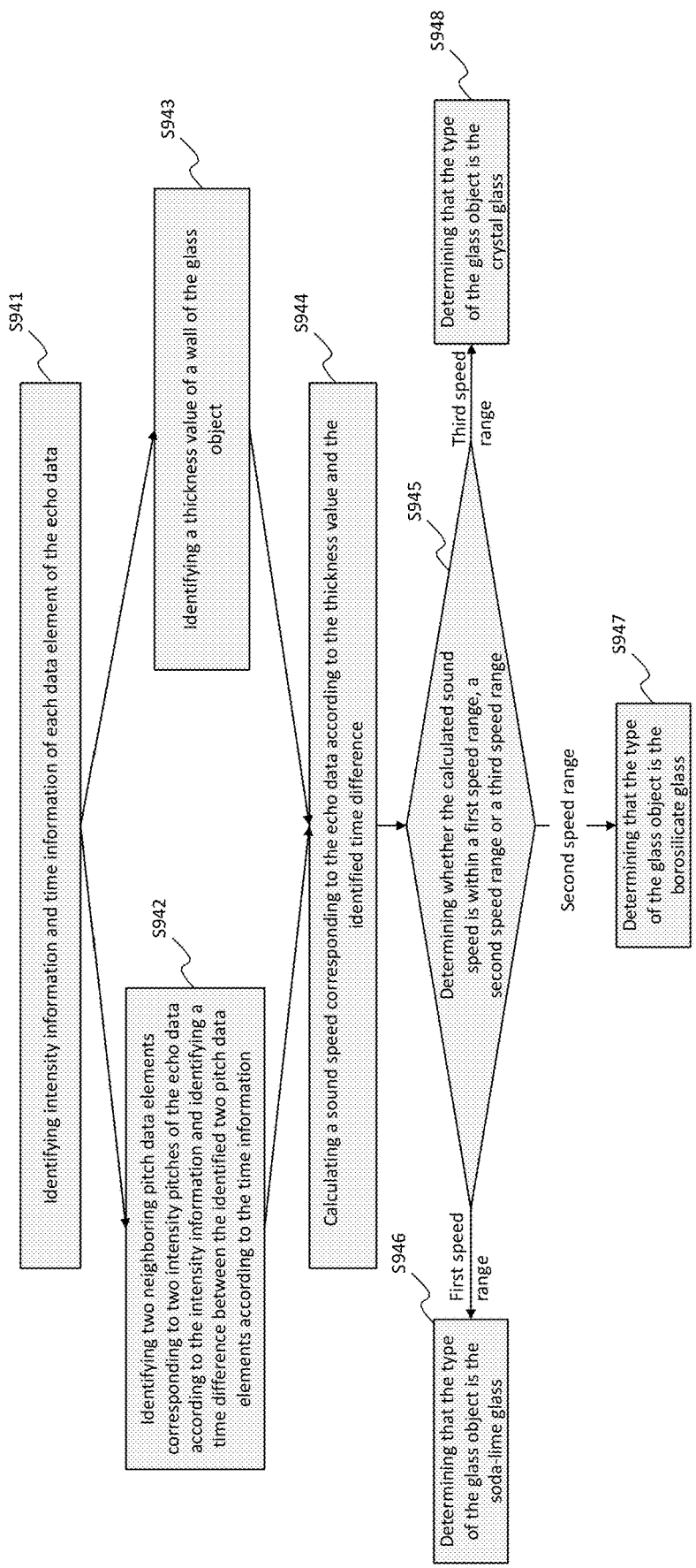
FIG. 9B depicts a flowchart of Sound-Speed acoustic analysis.

Specifically, referring to FIG. 9B, in step S941 the processor 110 identifies intensity information and time information of each data element of the echo data. Next, in step S942, the processor 110 identifies two pitch data elements corresponding to two neighboring intensity pitches of the echo data ED according to the intensity information, and then it identifies a time difference between the identified two pitch data elements according to the time information. In other words, in the sound-speed analysis, only two echoes are needed to complete the analysis.

Furthermore, in step S943, the processor 110 identifies a thickness value of a wall of the glass object 200.

Next, in step S944, the processor 110 calculates a sound speed corresponding to the echo data according to the thickness value and the identified time difference.

Figure 10:
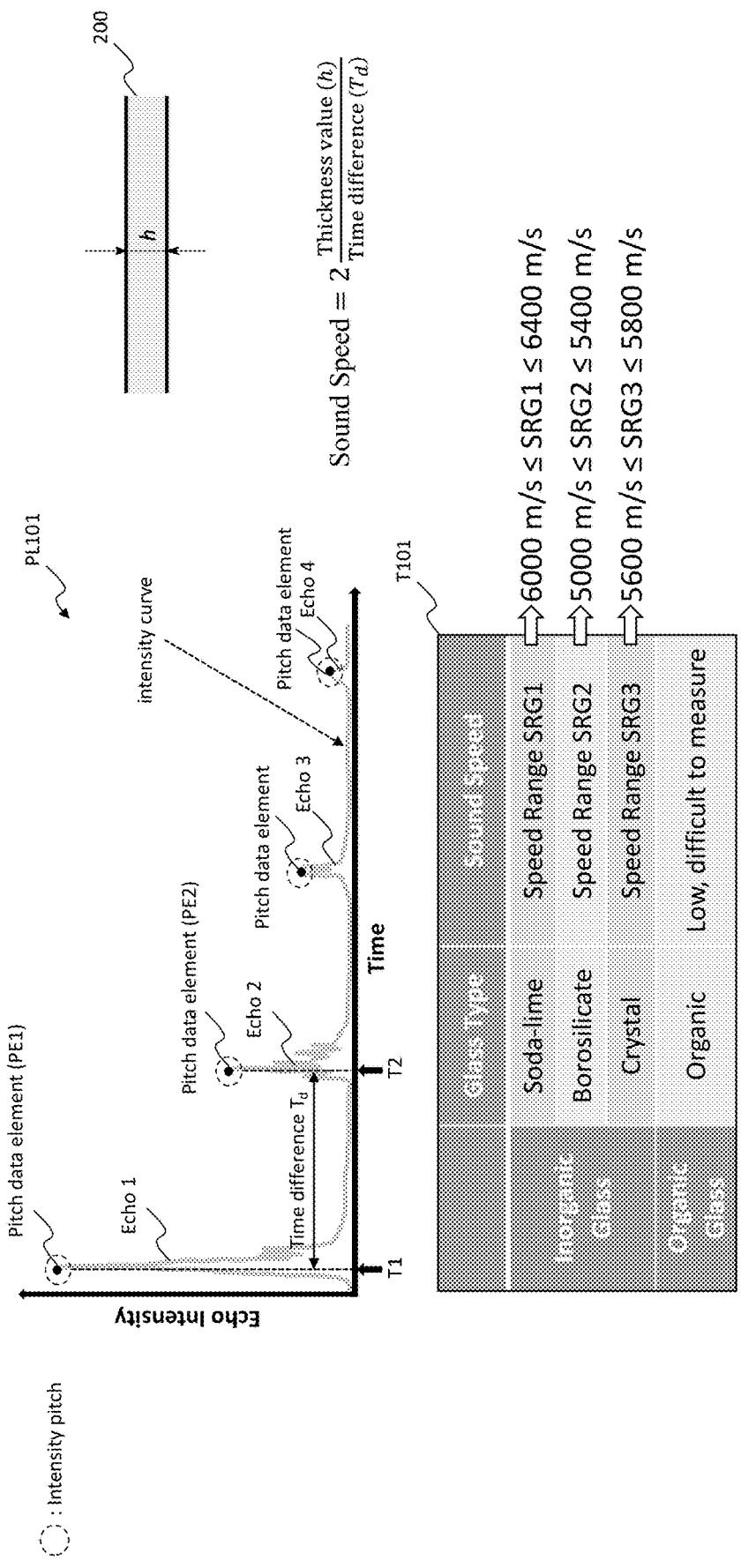
FIG. 10 depicts a schematic diagram of Sound-Speed acoustic analysis.

For example, referring to FIG. 10, a 2D domain plot PL101 can be established according to the intensity information and the time information of the echo data. An intensity curve is generated according to data elements of the echo data. In plot PL101, there are four intensity pitches, and each intensity pitch has a corresponding pitch data element on the top. However, as mentioned before, only two neighboring pitches are used in the sound-speed analysis (e.g., echo 1 and echo 2). In other words, the size of the required echo data can be reduced to have data elements capable of constructing two intensity pitches.

The processor 110 identifies the time T1 corresponding to the pitch data element PE1 and the time T2 corresponding to the pitch data element PE2. Then the processor 110 identifies time difference $T_d$ according to time T1 and time T2.

The sound speed is calculated based on a formula (3) below.

$$\text{Sound speed} = 2\frac{h}{T_d} \quad (3)$$

where h indicates the thickness value; and $T_d$ indicates the time difference.

After the sound speed is calculated, in step S945 the processor 110 determines whether the calculated sound speed is within the first speed range, the second speed range or the third speed range.

If the calculated sound speed is within the first speed range SRG1, in step S946, the processor 110 determines that the type of the glass object is the soda-lime glass.

If the calculated sound speed is within the second speed range SRG2, in step S947, the processor 110 determines that the type of the glass object is the borosilicate glass.

If the calculated sound speed is within the third speed range SRG3, in step S948, the processor 110 determines that the type of the glass object is the crystal glass.

For example, as illustrated by table T101, the sound speed range SRG1 corresponding to soda-lime glass is higher than or equal to 6000 m/s, and less than or equal to 6400 m/s; the sound speed range SRG2 corresponding to borosilicate glass is higher than or equal to 5000 m/s, and less than or equal to 5400 m/s; and the sound speed range SRG3 corresponding to crystal glass is higher than or equal to 5600 m/s, and less than or equal to 5800 m/s.

Figure 11:
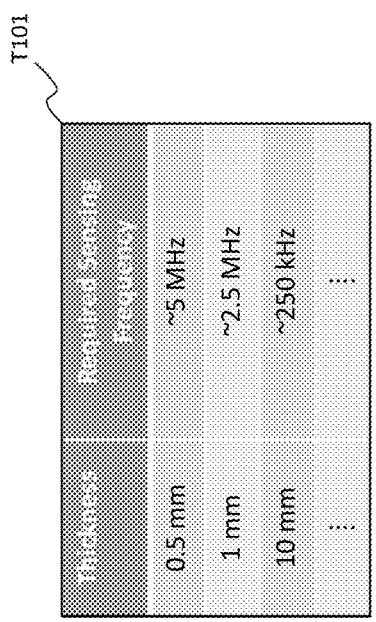
FIG. 11 depicts a schematic diagram of preferred requirement for the transceiver design using in the Echo-Decay analysis and the Sound-Speed analysis.

Referring to FIG. 11, certain requirements for the transceiver 140 design are provided for the echo-decay analysis and the sound-speed analysis.

As shown by table T101, the required sensing frequency of the transceiver 140 is different according to various thicknesses of the wall of the glass object.

Typically, a sensing frequency higher than 5 MHz is required to achieve sufficient resolving power for glass objects with a thickness larger than 0.5 mm.

It should be mentioned that for thick glass object (typically >1 cm), flat samples, or samples with a large curvature diameter (typically >10 cm), sound speed analysis can be implemented and it is most useful in industrial or construction glass waste sorting.

The functional units of the apparatuses and the methods in accordance to embodiments disclosed herein may be implemented using computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units in accordance to various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A computer-implemented method for classifying a glass object via acoustic analysis by a classifying apparatus, comprising:

receiving, by a processor of the classifying apparatus, sound data of a knock sound corresponding to the glass object, wherein the knock sound is received by a sensor of the classifying apparatus, and wherein the knock sound is generated using a hard object to impact the glass object;

determining, by the processor, a type of the glass object by performing a knock-sound analysis to the sound data, wherein the type of the glass object includes an organic glass and an inorganic glass, and wherein the knock-sound analysis comprising:

extracting intensity information and frequency information of each data element of the sound data;

identifying a target data element having a maximum intensity among all of the data elements of the sound data according to the intensity information;

identifying a target frequency of the target data element according to the frequency information; and determining whether the target frequency is higher than a predefined frequency threshold;

if the target frequency is not higher than the predefined frequency threshold, determining that the type of the glass object being organic glass; else if the target frequency is higher than a predefined frequency threshold, determining that the type of the glass object being inorganic glass;

if the type of the glass object is determined to be inorganic glass, receiving, by the processor, echo data of an echo corresponding to the glass object, wherein the echo is induced by a transceiver of the classifying apparatus applying an ultrasonic-echo operation to the glass object, and wherein the echo is received by the transceiver; and determining, by the processor, a further type of the glass object by performing an echo-decay analysis to the echo data, wherein the further type of the glass object includes crystal glass, borosilicate glass and soda-lime glass.

2. The computer-implemented method of claim 1, wherein the type of the glass object further includes soda-lime glass; and wherein the determination of the type of the glass object by performing the knock-sound analysis to the sound data further comprises:
if the target frequency is higher than a predefined frequency threshold, determining whether the target data element is corresponding to a first one of one or more intensity pitches of the data elements;
if the target data element is corresponding to the first one intensity pitch, determining that the type of the glass object being soda-lime glass; and else
if the target data element is not corresponding to the first one intensity pitch, determining that the type of the glass object being a type of inorganic glass other than soda-lime glass.

3. The computer-implemented method of claim 1, wherein the predefined frequency threshold is approximately 2 kHz.

4. The computer-implemented method of claim 1, wherein the determination of the further type of the glass object by performing the echo-decay analysis to the echo data comprises:
extracting intensity information and time information of each data element of the echo data;
identifying one or more pitch data elements corresponding to one or more intensity pitches of the echo data according to the intensity information;
fitting an intensity function to each intensity of the pitch data elements, so as to obtain the intensity function's decay coefficient corresponding to the echo data;
determining whether the decay coefficient is within a first range, a second range or a third range;
if the decay coefficient is within the first range, determining that the type of the glass object is the soda-lime glass; else
if the decay coefficient is within the second range, determining that the type of the glass object is the borosilicate glass; and else
if the decay coefficient is within the third range, determining that the type of the glass object is the crystal glass.

5. The computer-implemented method of claim 4, wherein the intensity function is presented based on a formula below:

$$A(t)=A(0)e^{-B(t-c)}$$

where A(t) indicates the pitch intensity as a function of time; A(0) indicates the intensity of the first one pitch; B indicates the decay coefficient; and C indicates timing of the first one pitch, arbitrarily set to 0.

6. The computer-implemented method of claim 4, wherein a requirement of the transceiver comprises:
a diameter of the transceiver for receiving the echo is smaller than 3.5 mm.

7. A computer-implemented method for classifying a glass object via acoustic analysis by a classifying apparatus, comprising:
receiving, by a processor of the classifying apparatus, sound data of a knock sound corresponding to the glass object, wherein the knock sound is received by a sensor of the classifying apparatus, and wherein the knock sound is generated using a hard object to impact the glass object;
determining, by the processor, a type of the glass object by performing a knock-sound analysis to the sound data, wherein the type of the glass object includes an organic glass and an inorganic glass, and wherein the knock-sound analysis comprising:
extracting intensity information and frequency information of each data element of the sound data;
identifying a target data element having a maximum intensity among all intensities of the data elements of the sound data according to the intensity information;
identifying a target frequency of the target data element according to the frequency information; and
determining whether the target frequency is higher than a predefined frequency threshold;
if the target frequency is not higher than the predefined frequency threshold, determining that the type of the glass object being organic glass; else
if the target frequency is higher than a predefined frequency threshold, determining that the type of the glass object being inorganic glass,
if the type of the glass object is determined to be inorganic glass, receiving, by the processor, echo data of an echo corresponding to the glass object, wherein the echo is induced by a transceiver of the classifying apparatus applying an ultrasonic-echo operation to the glass object, and wherein the echo is received by the transceiver; and
determining a further type of the glass object by performing a sound-speed analysis to the echo data, wherein the further type of the glass object includes crystal glass, borosilicate glass and soda-lime glass.

8. The computer-implemented method of claim 7, wherein the type of the glass object further includes soda-lime glass; and wherein the determination of the type of the glass object by performing the knock-sound analysis to the sound data further comprises:
if the target frequency is higher than a predefined frequency threshold, determining whether the target data element is corresponding to a first one of one or more intensity pitches of the data elements;
if the target data element is corresponding to the first one intensity pitch, determining that the type of the glass object being soda-lime glass; and else
if the target data element is not corresponding to the first one intensity pitch, determining that the type of the glass object being a type of inorganic glass other than soda-lime glass.

9. The computer-implemented method of claim 7, wherein the predefined frequency threshold is approximately 2 kHz.

10. The computer-implemented method of claim 7, wherein the determination of the further type of the glass object by performing the sound-speed analysis to the echo data comprises:
   extracting intensity information and time information of each data element of the echo data;
   identifying two pitch data elements corresponding to two neighboring intensity pitches of the echo data according to the intensity information;
   identifying a time difference between the identified two pitch data elements according to the time information;
   identifying a thickness value of a wall of the glass object;
   calculating a sound speed corresponding to the echo data according to the thickness value and the identified time difference;
   determining whether the calculated sound speed is within a first speed range, a second speed range or a third speed range;
   if the calculated sound speed is within the first speed range, determining that the type of the glass object is the soda-lime glass; else
   if the calculated sound speed is within the second speed range, determining that the type of the glass object is the borosilicate glass; and else
   if the calculated sound speed is within the third speed range, determining that the type of the glass object is the crystal glass.

11. The computer-implemented method of claim 10, wherein the sound speed is calculated based on a formula below:

$$\text{Sound speed} = 2\frac{h}{T_d}$$

where h indicates the thickness value; and $T_d$ indicates the time difference.

12. A classifying apparatus for classifying a glass object via acoustic analysis, comprising:
   a sound-generating means, configured to generate a knock sound by applying a knocking operation on the glass object, wherein the knocking operation comprises the sound-generating means controlling a hard object to knock on a wall of the glass object;
   a transceiver, electrically coupled to the sound-generating means, wherein the sound-generating means is further configured to instruct the transceiver to induce an echo by applying an ultrasonic-echo operation on the glass object, and wherein the transceiver is further configured to receive the echo; and
   a sensor, configured to receive the knock sound; and
   a processor, electrically coupled to the sound-generating means, the transceiver and the sensor, wherein the processor is configured to execute machine instructions to implement a computer-implemented method, the method comprising:
   receiving, by the processor, sound data of the knock sound received by the sensor;
   determining, by the processor, a type of the glass object by performing a knock-sound analysis to the sound data, wherein the type of the glass object includes an organic glass and an inorganic glass;
   if the type of the glass object is determined as the inorganic glass, receiving, by the processor, echo data of the echo from the transceiver, wherein the echo data is generated according to the received echo by the transceiver; and
   determining, by the processor, a further type of the glass object by performing an echo-decay analysis to the echo data, wherein the further type of the glass object includes a crystal glass, a borosilicate glass and a soda-lime glass.

13. The classifying apparatus of claim 12, wherein the determination of the type of the glass object by performing the knock-sound analysis to the sound data comprises:
   extracting intensity information and frequency information of each data element of the sound data;
   identifying a target data element having a maximum intensity among all intensities of the data elements of the sound data according to the intensity information;
   identifying a target frequency of the target data element according to the frequency information;
   determining whether the target frequency is higher than a predefined frequency threshold;
   if the target frequency is not higher than the predefined frequency threshold, determining that the type of the glass object is the organic glass;
   if the target frequency is higher than a predefined frequency threshold, determining whether the target data element is corresponding to a first one of one or more intensity pitches of the data elements; else
   if the target data element is corresponding to the first one intensity pitch, determining that the type of the glass object is the soda-lime glass; and else
   if the target data element is not corresponding to the first one intensity pitch, determining that the type of the glass object is the inorganic glass.

14. The classifying apparatus of claim 13, wherein the type of the glass object further includes soda-lime glass; and
   wherein the determination of the type of the glass object by performing the knock-sound analysis to the sound data further comprises:
   if the target frequency is higher than a predefined frequency threshold, determining whether the target data element is corresponding to a first one of one or more intensity pitches of the data elements;
   if the target data element is corresponding to the first one intensity pitch, determining that the type of the glass object being soda-lime glass; and else
   if the target data element is not corresponding to the first one intensity pitch, determining that the type of the glass object being a type of inorganic glass other than soda-lime glass.

15. The classifying apparatus of claim 13, wherein the predefined frequency threshold is 2 kHz.

16. The classifying apparatus of claim 12, wherein the determination of the further type of the glass object by performing the echo-decay analysis to the echo data comprises:
   extracting intensity information and time information of each data element of the echo data;
   identifying one or more pitch data elements corresponding to one or more intensity pitches of the echo data according to the intensity information;
   fitting an intensity function to each intensity of the pitch data elements, so as to obtain the intensity function's decay coefficient corresponding to the echo data;
   determining whether the decay coefficient is within a first range, a second range or a third range;

if the decay coefficient is within the first range, determining that the type of the glass object is the soda-lime glass; else
if the decay coefficient is within the second range, determining that the type of the glass object is the borosilicate glass; and else
if the decay coefficient is within the third range, determining that the type of the glass object is the crystal glass.

17. The classifying apparatus of claim 16, wherein the intensity function is presented based on a formula below:

$$A(t)=A(0)e^{-B(t-c)}$$

where A(t) indicates the pitch intensity as a function of time; A(0) indicates the intensity of the first one pitch; B indicates the decay coefficient; and C indicates timing of the first one pitch, arbitrarily set to 0.

18. The classifying apparatus of claim 16, wherein a requirement of the transceiver comprises:
a diameter of one of the transceiver for receiving the echo is smaller than 3.5 mm.

19. A classifying apparatus for classifying a glass object via acoustic analysis, comprising:
a sound-generating means, configured to generate a knock sound by applying a knocking operation on the glass object, wherein the knocking operation comprises the sound-generating means controlling a hard object to knock on a wall of the glass object;
a transceiver, electrically coupled to the sound-generating means, wherein the sound-generating means is further configured to instruct the transceiver to induce an echo by applying an ultrasonic-echo operation on the glass object, and wherein the transceiver is further configured to receive the echo; and
a sensor, configured to receive the knock sound; and
a processor, electrically coupled to the sound-generating means, the transceiver and the sensor, wherein the processor is configured to execute machine instructions to implement a computer-implemented method, the method comprising:
receiving, by the processor, sound data of the knock sound from received by the sensor;
determining, by the processor, a type of the glass object by performing a knock-sound analysis to the sound data, wherein the type of the glass object includes an organic glass and an inorganic glass;
if the type of the glass object is determined as the inorganic glass, receiving, by the processor, echo data of the echo from the transceiver, wherein the echo data is generated according to the received echo by the transceiver; and
determining a further type of the glass object by performing a sound-speed analysis to the echo data, wherein the further type of the glass object includes a crystal glass, a borosilicate glass and a soda-lime glass.

20. The classifying apparatus of claim 19,
wherein the determination of determining the type of the glass object is the organic glass, the inorganic glass or the soda-lime glass by performing the knock-sound analysis to the sound data comprises:
extracting intensity information and frequency information of each data element of the sound data;
identifying a target data element having a maximum intensity among all intensities of the data elements of the sound data according to the intensity information;
identifying a target frequency of the target data element according to the frequency information;
determining whether the target frequency is higher than a predefined frequency threshold;
if the target frequency is not higher than the predefined frequency threshold, determining that the type of the glass object is the organic glass; else
if the target frequency is higher than a predefined frequency threshold, determining that the type of the glass object is the inorganic glass.

21. The classifying apparatus of claim 20,
wherein the type of the glass object further includes soda-lime glass; and
wherein the determination of the type of the glass object by performing the knock-sound analysis to the sound data further comprises:
if the target frequency is higher than a predefined frequency threshold, determining whether the target data element is corresponding to a first one of one or more intensity pitches of the data elements;
if the target data element is corresponding to the first one intensity pitch, determining that the type of the glass object being soda-lime glass; and else
if the target data element is not corresponding to the first one intensity pitch, determining that the type of the glass object being a type of inorganic glass other than soda-lime glass.

22. The classifying apparatus of claim 20, wherein the predefined frequency threshold is approximately 2 kHz.

23. The classifying apparatus of claim 19,
wherein the determination of the further type of the glass object by performing the sound-speed analysis to the echo data comprises:
extracting intensity information and time information of each data element of the echo data;
identifying two pitch data elements corresponding to two neighboring intensity pitches of the echo data according to the intensity information;
identifying a time difference between the identified two pitch data elements according to the time information;
identifying a thickness value of a wall of the glass object;
calculating a sound speed corresponding to the echo data according to the thickness value and the identified time difference;
determining whether the calculated sound speed is within a first speed range, a second speed range or a third speed range;
if the calculated sound speed is within the first speed range, determining that the type of the glass object is the soda-lime glass; else
if the calculated sound speed is within the second speed range, determining that the type of the glass object is the borosilicate glass; and else
if the calculated sound speed is within the third speed range, determining that the type of the glass object is the crystal glass.

24. The classifying apparatus of claim 23, wherein the sound speed is calculated based on a formula below:

$$\text{Sound speed} = 2\frac{h}{T_d}$$

where/indicates the thickness value; and $T_d$ indicates the time difference.

* * * * *